US008191451B2

(12) United States Patent
Stolyar et al.

(10) Patent No.: US 8,191,451 B2
(45) Date of Patent: Jun. 5, 2012

(54) WEB-SLITTER WITH ELECTRONIC MOTOR CONTROL

(76) Inventors: Semion Stolyar, Portland, OR (US); Thomas Kirk, Camas, WA (US); Richard M. Holbert, Washougal, WA (US); Robert M. Houze, Washougal, WA (US); Daniel E. Tooke, Boring, OR (US)

( * ) Notice: Subject to any disclaimer, the term of this patent is extended or adjusted under 35 U.S.C. 154(b) by 0 days.

(21) Appl. No.: 13/206,129

(22) Filed: Aug. 9, 2011

(65) Prior Publication Data

US 2011/0303063 A1 Dec. 15, 2011

Related U.S. Application Data

(63) Continuation of application No. 11/809,739, filed on Jun. 1, 2007, now abandoned.

(51) Int. Cl.
*B23Q 15/00* (2006.01)
*B23D 19/04* (2006.01)

(52) U.S. Cl. ................................ 83/72; 83/499; 83/506

(58) Field of Classification Search .............. 83/72, 495, 83/482, 498, 499, 500, 501, 502, 504, 505, 83/507, 508.1, 508.2, 508.3, 582, 583, 302
See application file for complete search history.

(56) References Cited

U.S. PATENT DOCUMENTS 1,985,856 A * 12/1934 Evans .......................... 83/477.1
3,080,784 A * 3/1963 Schneider ....................... 83/482
3,176,566 A * 4/1965 Patterson, Jr. ................... 83/348
3,185,010 A * 5/1965 Printz et al. ...................... 83/482
3,651,723 A * 3/1972 Gallagher et al. .............. 83/864
3,748,934 A * 7/1973 Lezberg ............................ 82/48
3,834,258 A 9/1974 Zumstein
3,847,394 A * 11/1974 Logemann et al. ........... 473/101
3,977,284 A * 8/1976 Mastriani et al. ............... 83/495
3,992,614 A 11/1976 Buss
4,024,784 A * 5/1977 Mueller .......................... 83/488
4,028,973 A 6/1977 Bogdanski et al.
4,072,887 A 2/1978 Buschmann et al.
4,092,886 A 6/1978 Nowisch
4,143,572 A * 3/1979 Schonmeier .................... 83/501
4,245,534 A * 1/1981 Van Cleave ..................... 83/500
4,257,299 A * 3/1981 Aykut ............................. 83/482
4,263,827 A * 4/1981 Pontarollo ...................... 83/482
4,275,631 A 6/1981 Wingen
4,428,265 A 1/1984 Bolton
4,430,657 A * 2/1984 Scott et al. ...................... 346/32
4,434,695 A * 3/1984 Wingen .......................... 83/482
4,438,673 A * 3/1984 Noffke et al. .................. 83/502
4,474,096 A * 10/1984 Muller ............................ 83/482
4,543,867 A 10/1985 Ichikawa
(Continued)

FOREIGN PATENT DOCUMENTS

DE 4130799 3/1992
(Continued)

*Primary Examiner* — Sean Michalski
(74) *Attorney, Agent, or Firm* — Robert Anton Pasic

(57) ABSTRACT

An electronically controlled web-slitter includes dual electric motors whose functions may be controlled by an electronic controller accessed either on the chassis of the web-slitter or by way of a computer coupled to the electronic controller. Vertical and side-shift blade set-up and functions are accurately controlled. The device includes a dovetail fitting for providing structural connection of parts, and a follower engaged with said first motor for translating rotational movement into vertical motion, and multiple sensors for sensing and controlling motor positions within the device.

10 Claims, 7 Drawing Sheets

U.S. PATENT DOCUMENTS

| | | | | |
|---|---|---|---|---|
| 4,592,259 | A * | 6/1986 | Gorner et al. | 83/13 |
| 4,607,552 | A * | 8/1986 | Siler | 83/76.7 |
| 4,614,138 | A * | 9/1986 | Altman | 83/51 |
| 4,627,214 | A * | 12/1986 | Anderson et al. | 53/71 |
| 4,741,234 | A * | 5/1988 | Colombo | 83/481 |
| 5,247,865 | A * | 9/1993 | Kroger et al. | 83/482 |
| 5,503,053 | A * | 4/1996 | Onishi et al. | 83/488 |
| 6,148,706 | A * | 11/2000 | Witjes | 83/495 |
| 6,578,458 | B1 * | 6/2003 | Akram et al. | 83/13 |
| 6,732,625 | B1 * | 5/2004 | Boynton et al. | 83/482 |
| 6,877,412 | B2 | 4/2005 | Supe-Dienes et al. | |
| 6,899,003 | B1 * | 5/2005 | Yoshii | 83/438 |
| 7,086,173 | B1 * | 8/2006 | Alatalo et al. | 33/640 |
| 7,472,635 | B2 | 1/2009 | Supe-Dienes et al. | |
| 7,578,222 | B2 * | 8/2009 | Liebheit | 83/425.4 |
| 7,703,365 | B2 * | 4/2010 | Wight et al. | 83/471.1 |
| 2003/0000360 | A1 * | 1/2003 | Sanda | 83/495 |
| 2003/0188611 | A1 * | 10/2003 | Solberg | 83/13 |
| 2004/0149105 | A1 * | 8/2004 | Michalski | 83/495 |
| 2004/0154151 | A1 * | 8/2004 | Lile et al. | 29/407.04 |
| 2004/0173074 | A1 * | 9/2004 | Li et al. | 83/495 |
| 2005/0229762 | A1 * | 10/2005 | Flaherty et al. | 83/499 |
| 2006/0065091 | A1 * | 3/2006 | Liebheit | 83/425.4 |
| 2006/0181690 | A1 * | 8/2006 | Nishinaga et al. | 355/53 |
| 2008/0236354 | A1 * | 10/2008 | Esposito | 83/169 |
| 2008/0295664 | A1 * | 12/2008 | Stolyar et al. | 83/506 |
| 2009/0031851 | A1 * | 2/2009 | Centner et al. | 74/608 |
| 2009/0084241 | A1 * | 4/2009 | Annoura | 83/495 |

FOREIGN PATENT DOCUMENTS

| | | |
|---|---|---|
| DE | 202007004327 | 5/2007 |
| EP | 838313 | 4/1988 |
| GB | 1040341 | 8/1966 |
| JP | 09123312 | 5/1996 |

* cited by examiner

WEB-SLITTER WITH ELECTRONIC MOTOR CONTROL

CROSS-REFERENCE TO RELATED APPLICATIONS

This is a continuation of application Ser. No. 11/809,739 and claims the original filing date of Jun. 1, 2007.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

Description of Related Art Including Information Disclosed Under 37 CFR 1.97 and 1.98

A web-slitting machine or system typically employs a number of web-slitting assemblies to cut an endless moving web, such as a continuous roll of paper or other material, into a number of strips (equal to the number of web-slitting assemblies plus one). A web-slitting machine of this type is shown in U.S. Pat. No. 6,732,625, which is owned by the assignee herein. The web-slitting machine supports and permits the positional adjustment of the web-slitting assemblies, thereby permitting the machine to be configured to cut any one out of a wide variety of strip width sets. A typical web-slitting assembly includes a web-slitter having a blade or knife that overlaps with a lower anvil, so that together they present a scissors-like action to a continuous web of material that is pulled through the assembly by a drum or a take-up reel. The web-slitter usually includes an upper carriage, which is slideably movable along a support in the form of a transverse bar, and a blade holder that includes a freely rotating disk-shaped blade. The anvil, which may be in the form of a drum or roller that has a sharpened edge, is positioned on a supporting sleeve.

This application claims the priority date of U.S. application Ser. No. 11/809,739, having a filing date of Jun. 1, 2007. The web-slitter of the '625 patent is hydraulically operated. Both the vertical motion of the blade holder and the side shift motion of the blade are controlled through hydraulic motors that are fed by fluid under pressure. Proper set-up and alignment of the blade with the lower anvil are important. Different webs require variations in blade/anvil overlap and in lateral side-shift pressure.

Most web-slitters operate under hydraulic control, and set-up parameters must be established manually. At least one such machine uses electric motors to control vertical and side shift motions as shown in German publication DE4130799. The aforementioned publication employs a single motor and complex gearing for these functions. In addition, the vertical and lateral travel of the blade are interconnected making set-up more efficient.

BRIEF SUMMARY OF THE INVENTION

An electronically controlled web-slitter includes dual electric motors whose functions may be controlled by an electronic controller accessed either on the chassis of the web-slitter or by way of a computer coupled to the electronic controller. Vertical and side-shift blade set-up and functions are thus accurately controlled.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Web-slitting machinery of this type typically employs hydraulic actuators of the type shown in U.S. Pat. Nos. 5,083,489 and 6,732,625. In terms of both set-up and operation, however, hydraulically controlled components lack precision and, in particular lack the precision that would be obtainable if an electronic controller in conjunction with electric motors were used to control both the set-up and operation of a web-slitting machine. By contrast, electric motors are well suited for such control. Such motors may take the form of stepper motors, servomotors, or vector-controlled motors. By using stepper motors, for example, each discrete increment of movement by the motor components may be controlled by a discrete number of digital pulses generated by an electronic controller. The pulse count may be stored in the controller's memory to give precise control of both vertical movement of the blade holder relative to the carriage assembly and the side-shift motion of the blade. Further, the electric motors may be connected to a computer through an interface circuit so that commands required to execute certain functions may be controlled remotely. The computer may then control an entire bank of web-slitters. Thereafter when the set-up mode is launched, each controller searches its memory for the correct sequence and pulse count needed to execute steps that cause the blades to set up correctly and interface properly with the lower anvils.

Figure 1:
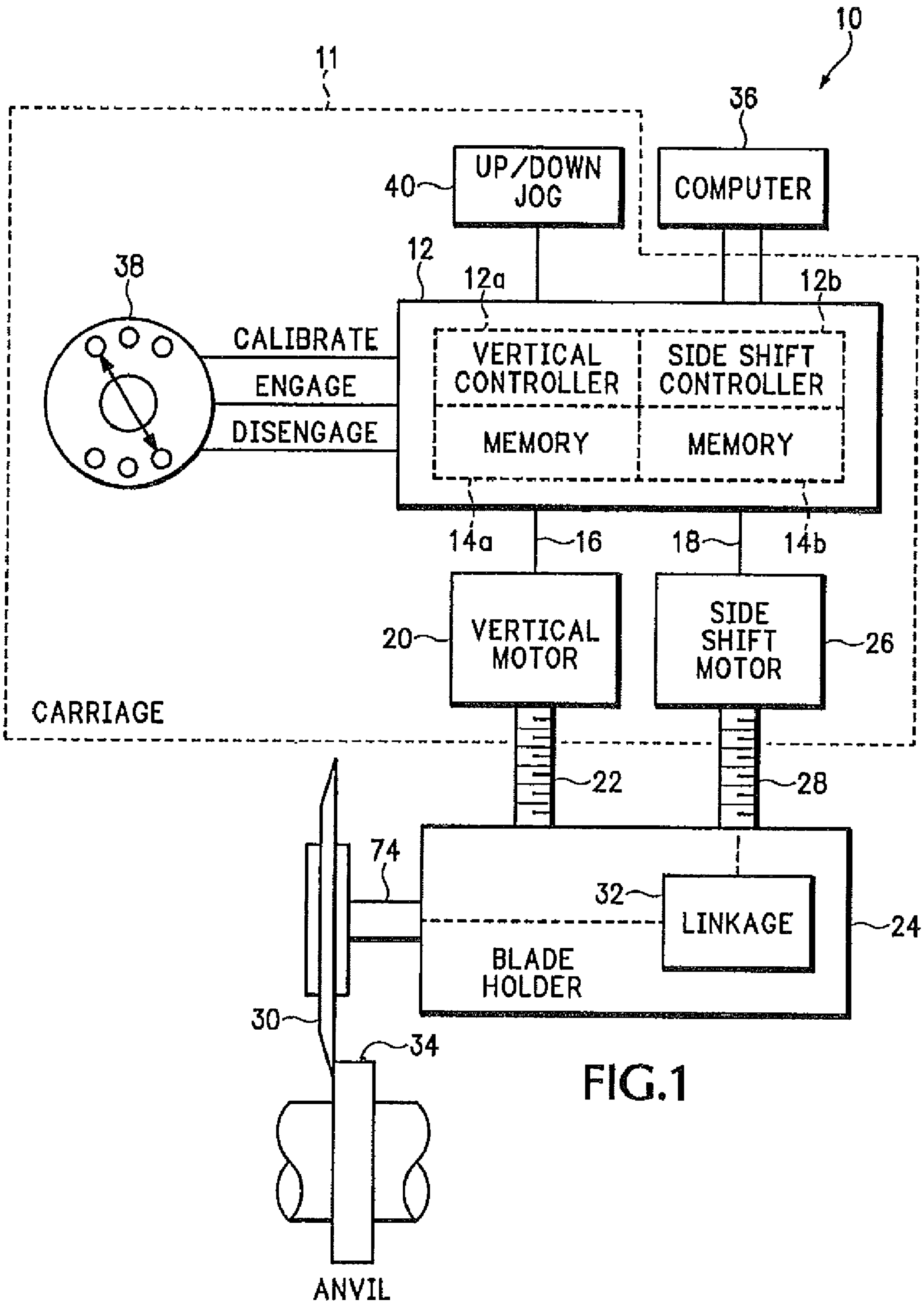
FIG. 1 is a schematic diagram of an electronically controlled web-slitter using dual electric motors.

An example of a motor-controlled web-slitter is shown in schematic diagram form in FIG. 1. A web-slitter 10 includes a carriage 11 that houses an electronic controller 12 having a vertical controller 12*a* and a side-shift controller 12*b*. Each of the controllers 12*a* and 12*b* has a memory unit 14*a* and 14*b* respectively. The output of the controller 12 is a dual-axis output. One output 16 drives a vertical motor 20. This motor has and output shaft 22 that is used to raise and lower a blade-holder assembly 24. The vertical controller 12*a* has a second output 18, which drives a side-shift motor 26. The side-shift motor has a vertically-extending output shaft assembly 28, which mechanically couples to a slitting blade 30 through a mechanical linkage 32. The linkage 32 converts the vertical movement in the shaft assembly 28 to horizontal motion of the blade 30 through the linkage 32 so that it is drawn into contact with an anvil 34.

Figure 2A:
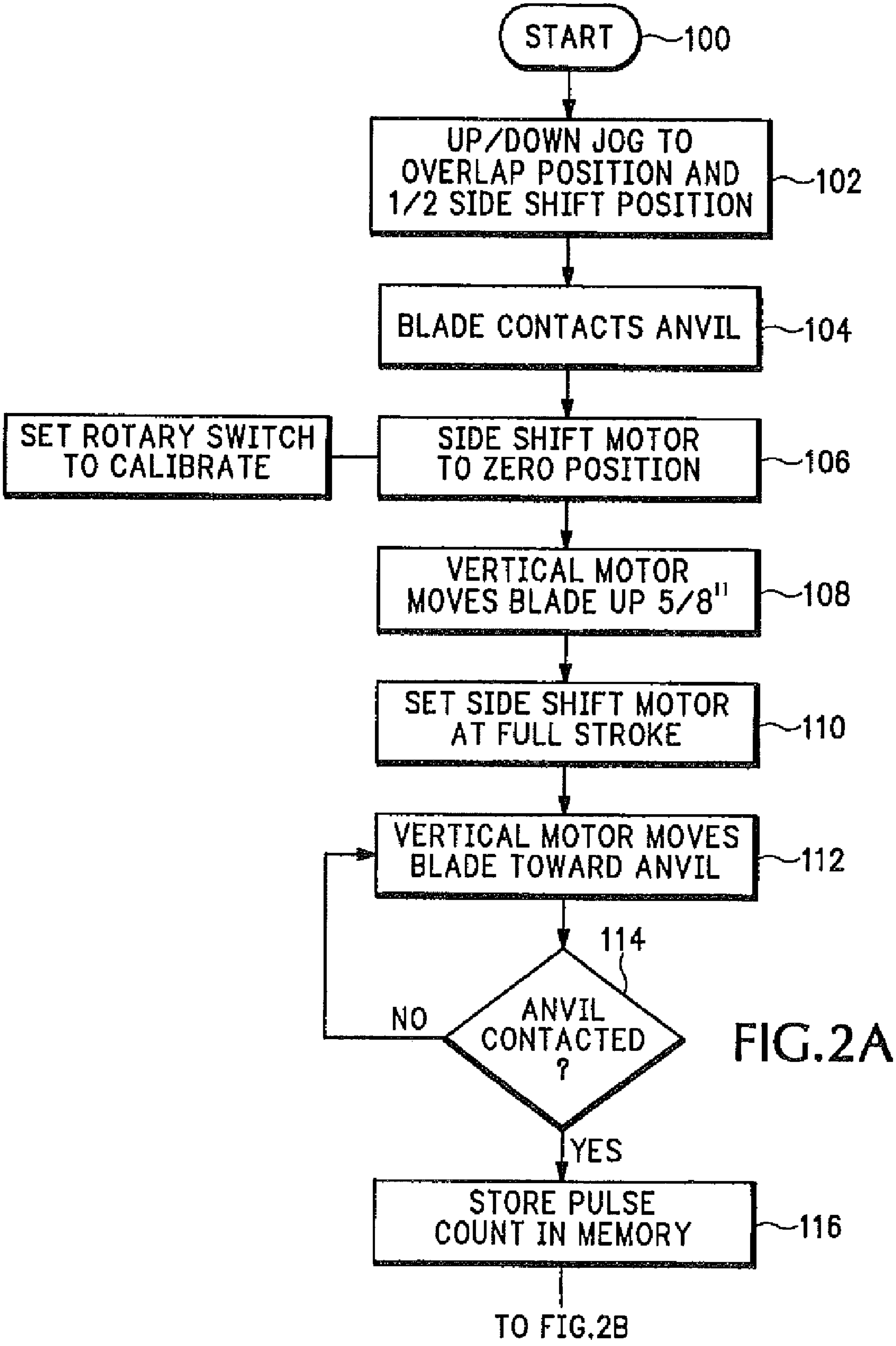
FIGS. 2A and 2B are a flow chart diagram illustrating the set-up and calibration routine employed by the electronic controller to properly set the blade for a cutting operation.
Figure 2B:
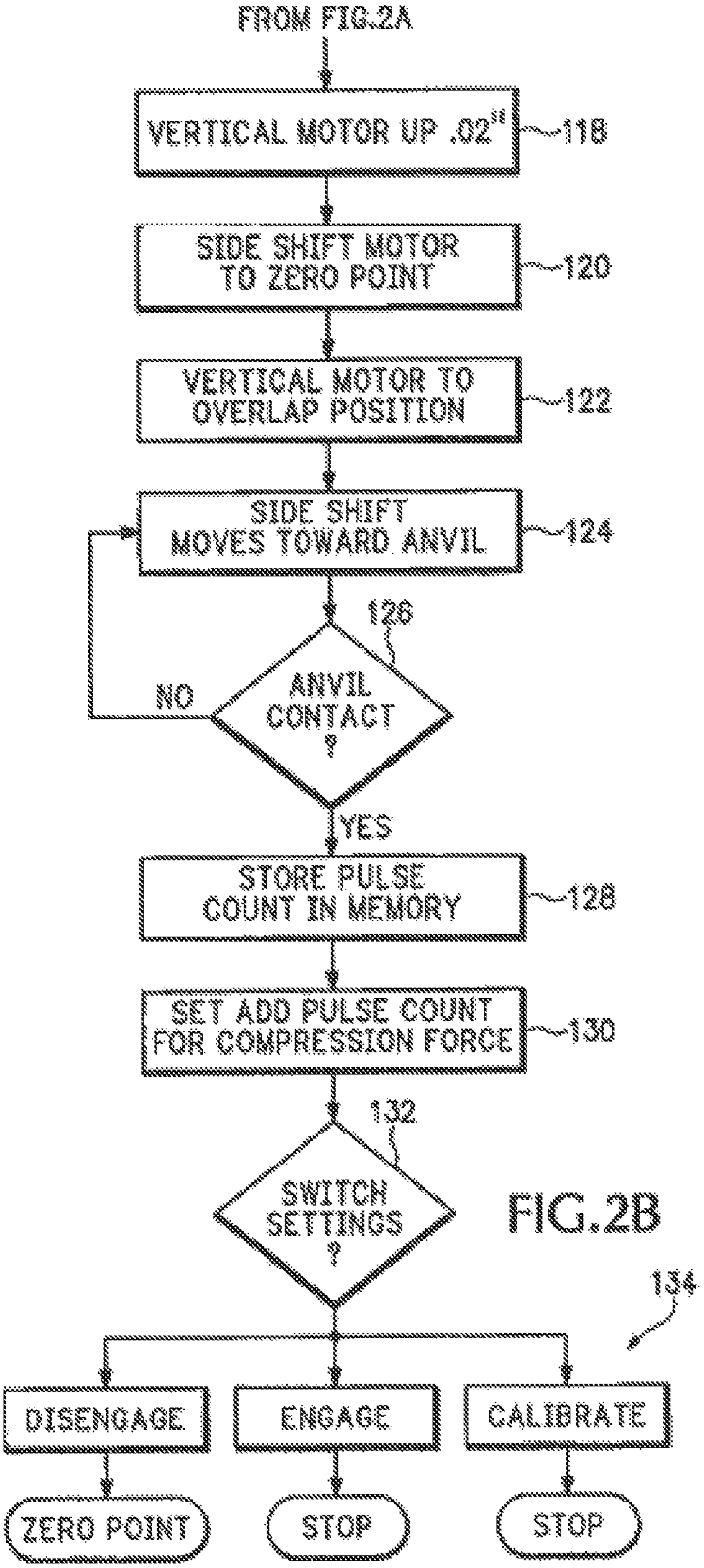

FIG. 2 shows a set-up routine employed by a preferred embodiment in which information stored in the controller boards 12*a* and 12*b* controls a calibration mode, which sets up the blade movement parameters for engaging the lower anvil 34. FIG. 2 illustrates the procedure for set-up and the operation of the electronic controller 12, which includes a circuit board with chip controllers and memory that execute the control functions illustrated in the flow chart.

The functions of the web-slitter are controlled, either from controls on the web-slitter itself or by an outboard computer 36. The computer 36 may implement set-up, run and disengage functions and may do so for a plurality of web-slitters. Web-slitters are usually arranged in a bank along a transverse bar predetermined distances apart. A computer, such as computer 36, may control a plurality of web-slitters simultaneously. Alternatively, each web-slitter may be individually controlled by control switches located on the carriage assembly 11. A front panel control 38 has three settings: "CALIBRATE;" "ENGAGE;" and "DISENGAGE." In addition, each carriage 11 has an up/down jog switch 40.

At start (100), the carriage 11 is positioned so that the blade 30 is slightly offset from the anvil 34. The up/down jog switch 40 is then engaged (102). The first time the up/down jog switch 40 is engaged (when the blade is in an offset position relative to the anvil), the vertical motor 20 lowers the blade-holder 24 and the side-shift motor 26 draws the blade 30 towards the right into a one-half stroke side-shift position. The blade 30 is moved manually to contact the anvil (104). The CALIBRATE mode is then selected by control 38 and the routine starts and queries the on-board control circuit boards 12*a*, 12*b* shown in FIG.

The side-shift controller 12*b* generates a signal to cause the side-shift motor 26 to go to its zero position (106). In this case, the zero position is the position at which the blade 30 is fully extended away from the anvil 34. As will be explained below, the zero position is detected by use of a photocell circuit or other contact-type or proximity sensor. Once the side-shift motor has caused the blade 30 to reach its zero position, a command is given by the vertical controller 12*a* to raise the blade 30 five-eighths of an inch (0.625") (108). The exact distance of this step (108) is chosen only for this particular example (as shown in the preferred embodiment) and other set-up parameters, depending upon the size of the blade and other factors, may be chosen depending upon the application.

Once step 108 has been completed, a command is given by the side-shift controller 12*b* to move the blade 30 to its full-stroke position (110). Once the blade has reached full-stroke position, the vertical motor moves the blade toward the anvil (112) until the anvil is contacted (114). Once again, the contact between the blade 30 and the anvil 34 is detected by the closing of the aforementioned electrical circuit, which is sensed by the controller 12. During this step, the output on line 16 is a series of pulses, which controls the movement of the vertical motor 20. Once contact is made between the blade 30 and the lower anvil 34, the pulse count required to move this distance is stored in the vertical controller's memory 14*a* (116). The controller then sends a signal to the vertical motor 20 causing it to raise the blade-holder assembly 24 a distance of 0.02 inches (118). Again, this figure is chosen depending upon the size of the blade employed and other requirements of the user.

Once step 118 has been completed, a command is given to the side-shift motor 26 to go to its zero point (120). The command is then given to require the vertical motor 20 to move the blade-holder assembly 24 to its overlap position (122). The overlap position is the vertical distance by which the blade 30 overlaps the anvil 34. This distance is chosen depending upon the size of the blade and the type of material to be cut. Thinner, lighter materials do not require as much overlap between the blade and the anvil as do thicker and harder to cut materials. This parameter is chosen and prestored in the vertical controller's memory 14*a* depending upon the requirements of the user.

A command is then given by the side-shift controller 12*b* through line 18 to cause the side-shift motor 26 to move the blade 30 toward the anvil 34 (124). Once contact is made with the anvil (126), the pulse count required to do so is stored in the memory 14*b* (128). It will be appreciated that, while merely touching the blade 30 to the anvil 34 closes the electrical circuit and therefore stops the side-shift motor 26, slight touching is inadequate for proper set-up. Therefore, from memory 14*b* a predetermined pulse count is added on line 18 to cause the side-shift motor 26 to add a certain amount of compression force for the blade 30 bearing against the anvil 34 (130). Once this occurs, the blade is now properly set up against the anvil and a cutting operation can begin.

At any time during the calibration process, the control 38 may be moved to either the ENGAGE or DISENGAGE position. If the control is either left in the CALIBRATE position or moved to the ENGAGE position, once step 130 has been completed the motors stop and the unit is ready for cutting. If the DISENGAGE setting has been chosen, once step 130 has been completed both the side-shift motor and the vertical motor move to their respective positions as illustrated in steps 132 and 134.

Proper initiation of the calibration mode requires that the blade be positioned correctly with respect to the anvil before the CALIBRATE mode is initiated. The use of the up/down jog switch 40 is provided to help fulfill this function. However, calibration may be initiated in other ways. For example, a retractable flag could be used, which would allow for manual positioning using the up/down jog switch 40 and movement of the carriage 11 along its transverse mounting bar. A retractable flag of this type could be a simple plastic guide member shaped to provide an initial vertical and lateral offset between the anvil and the blade. The starting position may then be stored in the memory units 14*a* and 14*b* of the controller 12 and the calibration routines and distances for movement (in terms of numbers of pulses required to accomplish certain tasks) may be adjusted accordingly. In yet another variation, a laser may be placed on the unit itself, which may be used to visually align the blade and the anvil prior to initiating the calibration mode.

The proper calibration and set-up for various applications requires establishing a pulse count in the memory unit 14*b* of the side-shift controller 12*b*. In the example shown, a preset pulse count stored in memory provides the proper side-shift compression. However, this function could be accomplished automatically—for example, by measuring the current draw on the motor for different preset side forces and the use of an analog sensor to stop the side-shift motor when the current draw matches the selected preset value. In another embodiment, a load transducer could be used to control the side-shift motor when the transducer measures a preset compression value.

Figure 3:
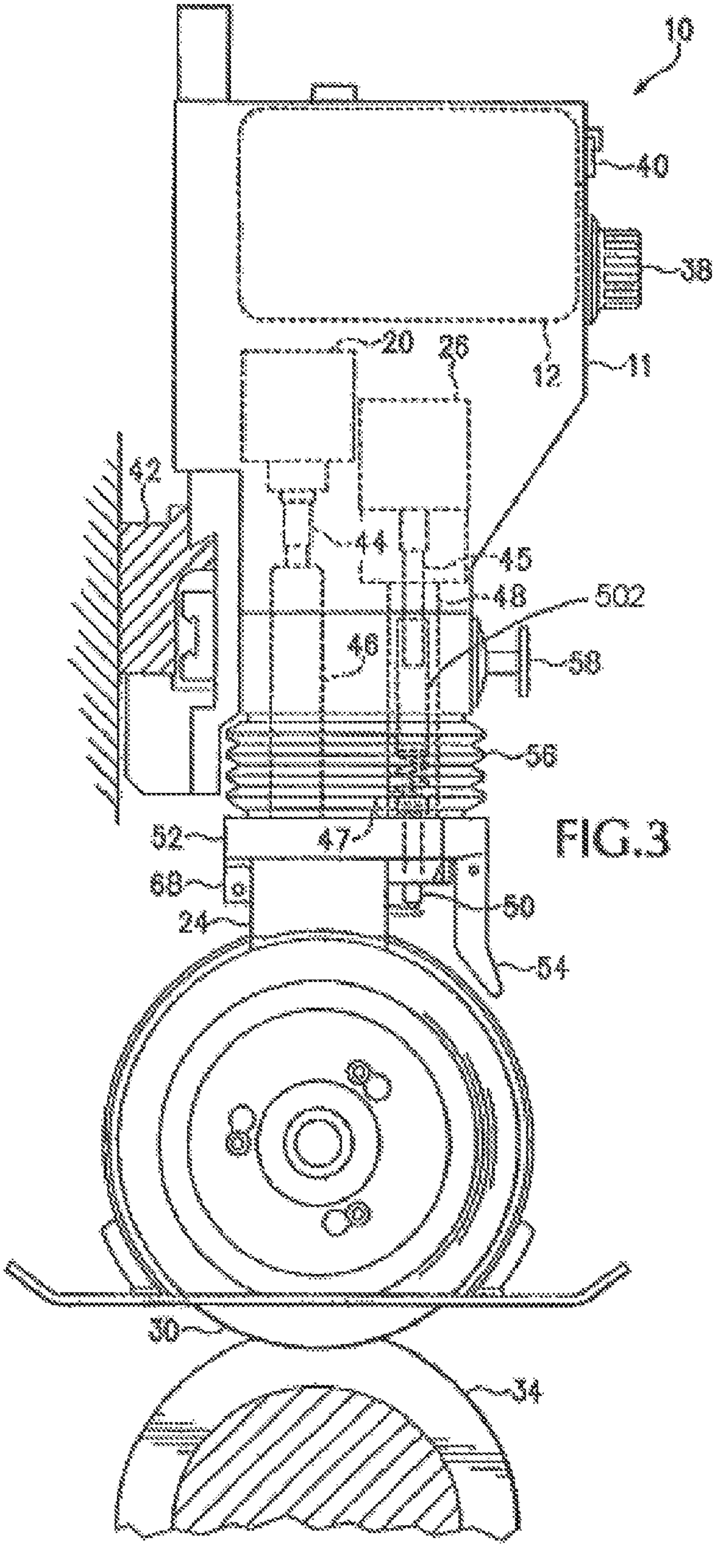
FIG. 3 is a side view of a web-slitter schematically illustrated in FIG. 1.

A mechanical configuration of the preferred embodiment illustrated schematically in FIG. 1 is shown in FIGS. 3 through 7. Referring to FIG. 3, a web-slitting machine 10 includes an upper carriage assembly 11 and a lower blade-holder assembly 24. The blade-holder assembly 24 supports a rotary knife/blade 30, which bears against an anvil 34. The upper carriage 11 is mounted for sliding movement along a transverse track 42. The control knob 38 is located on the front panel of the carriage assembly 11 along with the up/down jog switch 40. The carriage assembly 11 also houses the electronic controller 12, which is coupled through the output lines 16 and 18 respectively to the vertical motor 20 and the side-shift motor 26. The output of the vertical motor 20 is a rotating shaft 44, which fits into a threaded sleeve 46. The sleeve 46 includes a screw follower that raises and lowers the blade-holder assembly 24 when the output shaft 44 rotates. A sleeve 48 connected to the side-shift motor 26 houses a rotary shaft or rod 45 which is coupled to a follower 502 that compresses a spring 47, which, in turn, exerts a force that depresses a plunger 50. The spring 47 supplies the compression force that biases the blade 30 against the anvil 34 in the engaged position. When the blade 30 touches the anvil 34, a spring 76 in the side-shift piston 74 (refer to FIG. 7) is compressed. The blade, however, cannot press against the anvil without being allowed to give laterally with a preset amount of restoring force. The restoring force is provided by the action of the spring 47 bearing against the plunger 50. There is a spring constant stored in the side-shift controller 12*b* that links the vertical movement of the rod 45 with the amount of restoring force provided by the spring 47. Such formulae are well known and take into account mechanical advantage provided by the other components of the linkage 32 and friction.

The blade-holder assembly 24 is coupled to the carriage assembly 11 through a dovetail fitting 52 and blade holder base 501 and is locked into place by a locking lever 54. The dovetail fitting 52 has a receiver (not shown) for the guide rod 46 and for the sleeve 48. A bellows 56 houses the guide rod 46 and the sleeve 48, and expands and contracts as a result of vertical movement of the blade-holder assembly 24. The cant angle of the blade 30 (about a vertical axis) is set using a cant key 58, which is a removable key. Keys having different shapes set the appropriate cant angle chosen by the user.

Figure 4:
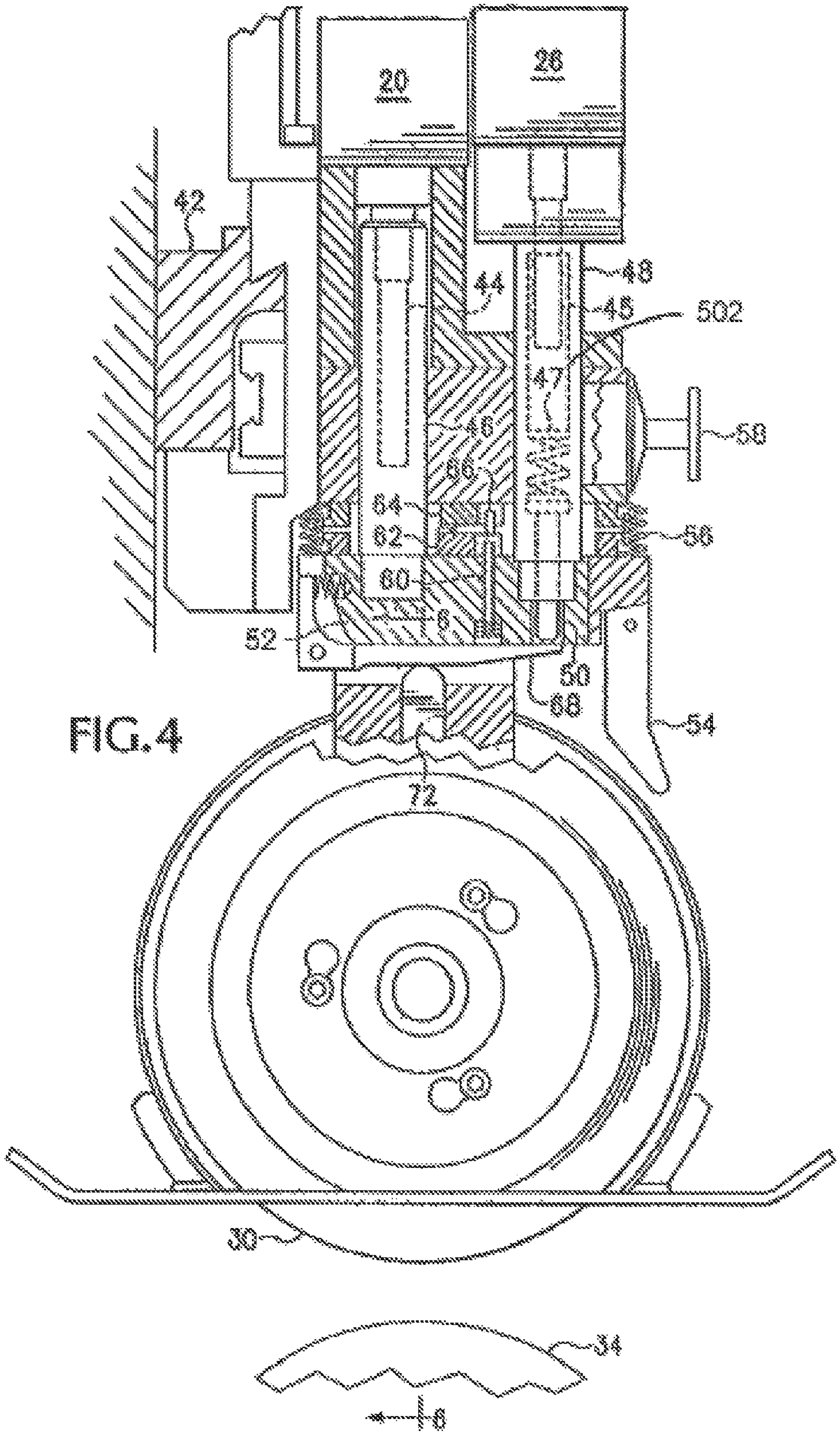
FIG. 4 is a partial side cutaway view of the web-slitter of FIG. 3 with the blade in a fully retracted position.
Figure 5:
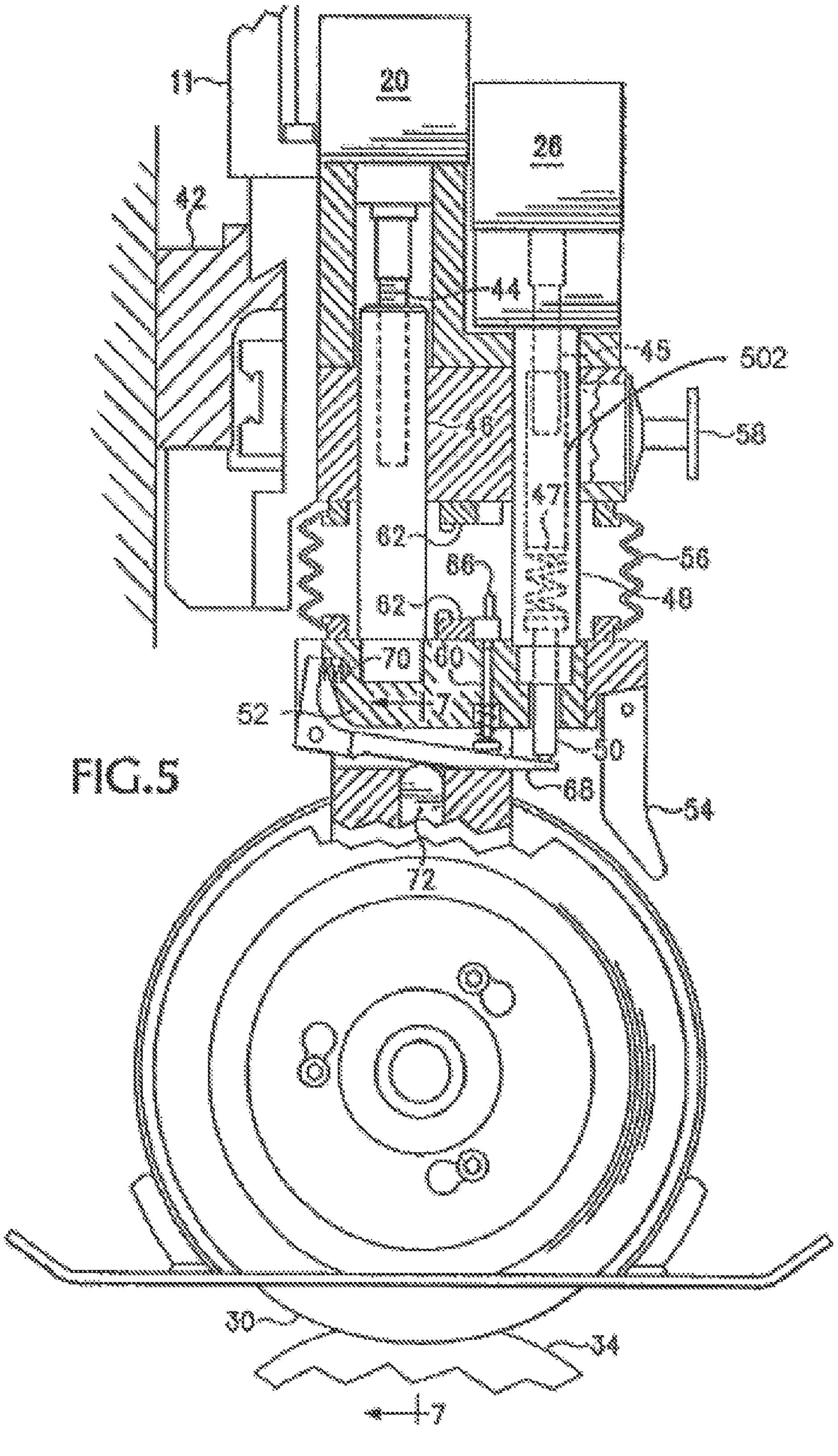
FIG. 5 is a partial side cutaway view of the web-slitter of FIG. 3 with the blade in the engaged position.

Referring to FIGS. 4 and 5, FIG. 4 shows the web-slitter 10 in its zero position, that is, the blade is fully upwardly retracted and the side-shift mechanism is likewise retracted. In the fully retracted position, a spring-loaded pin 60 breaks the beam of a photocell 62. This pin moves under the control of the side-shift linkage mechanism 32 as will be explained below. Another photocell 64 is controlled by a pin 66, which moves in a vertical direction with the blade-holder assembly 24. When the vertical motor 20 is at its fully retracted position, the pin 66 breaks the beam of the photocell 64 and turns off the vertical motor. Likewise, when the pin 60 breaks the beam of photocell 62 at the zero point of the side-shift mechanism, the side-shift motor 26 is turned off. The photocells 62 and 64 thus function as sensors to detect the fully retracted travel points as controlled by motors 20 and 26. The photocells 62 and 64 are connected to the electronic controller 12 by appropriate circuitry (not shown). The photocells 62 and 64 are just one example of sensor mechanisms that may be used to detect the limits of travel for both the side-shift and vertical motors. Other sensors, including limit switches, electrical contacts or other types of proximity sensors, may be used if desired.

In FIG. 5, the blade-holder assembly is fully extended and the side-shift linkage 32 has caused the blade 30 to engage the anvil 34. The output shaft (not shown) of the side-shift motor 26 pushes against the plunger 50, which in turn depresses a lever 68. The lever is biased in an upwards position by a bias spring 70. When the plunger 50 depresses the lever 68, the lever in turn presses downwardly against a wedge member 72. Wedge member 72 is guided vertically by the blade-holder base 501.

Figure 6:
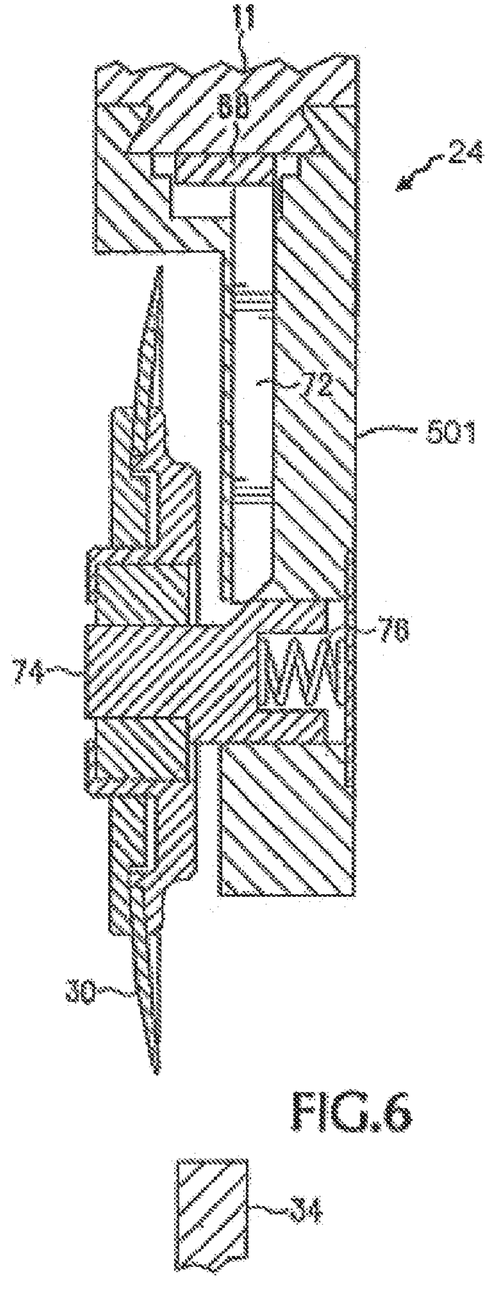
FIG. 6 is a front partial cutaway view taken along line 6-6 of FIG. 4.
Figure 7:
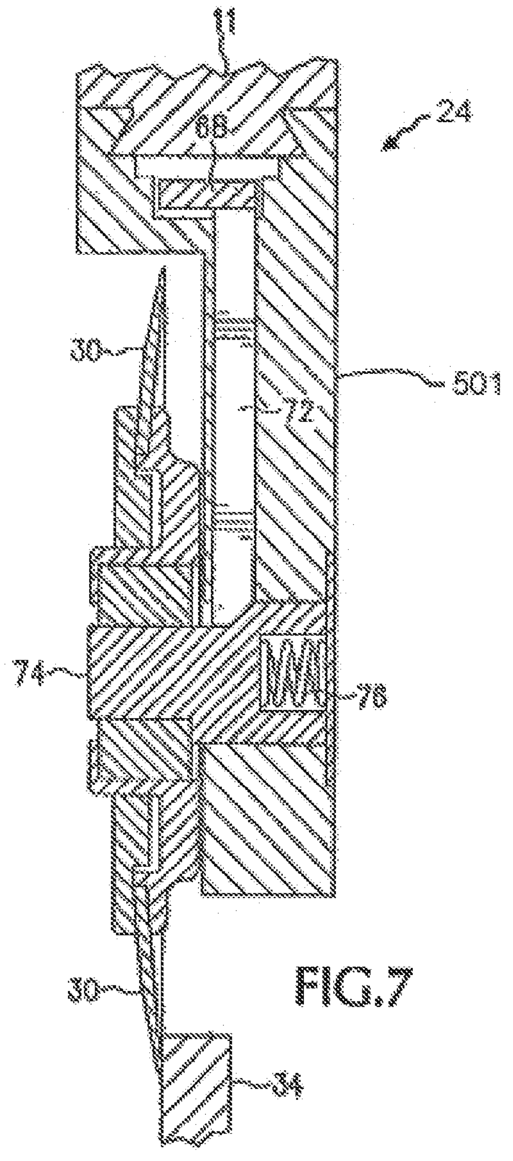
FIG. 7 is a front partial cutaway view taken along line 7-7 of FIG. 5.

As shown best in FIGS. 6 and 7, the wedge member 72 presses against an inclined surface of a side-shift piston 74. The side-shift piston 74 is normally biased outwardly by a spring 76. Thus, when depressed by the lever, the wedge member 72 forces the side-shift piston against the spring 76 to thereby contact the blade 30 to the anvil 34. The mechanical linkage shown in FIGS. 4 through 7 provides one example of a means by which the movement of the vertical output rod or shaft from the side-shift motor 26 may be converted from vertical to lateral movement. Many other mechanical constructions that will perform the same function are possible, including rack and pinion mechanisms, rotary cams or other gears that may be used to convert motion in a vertical direction to motion in a lateral direction. In addition, since the output of the side-shift motor is rod driven by a rotary shaft, it would be possible to link the rotary shaft directly with a gearing mechanism to provide lateral side-shift motion without using the intermediary of a vertical pushrod. Many such mechanical constructions are possible.

The use of dual electric motors, one for the vertical travel of the blade-holder assembly 24 and one for the side-shift function of the blade, means that both functions may be controlled independently. A single motor could control both functions, but the gearing required to do so would be more complex. Independent control of both the vertical movement of the blade and the side-shift movement of the blade insures that set-up and calibration may be more precisely controlled. Two critical set-up parameters are blade/anvil overlap and the amount of side-shift compression against the anvil. With each of these functions controlled by a separate electrical motor, overall accuracy of the system is greatly enhanced.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. An apparatus for positioning a blade (30) vertically with a lower anvil (34) and applying vertical force for conversion to horizontal force by an attached side shift mechanism against said lower anvil (34) for use in a web slitter comprising;

a) a carriage assembly b) a device coupled to the carriage assembly (11) for applying a predetermined vertical force comprising;

i) a sleeve (48) having a first and second end and a dovetail fitting (52) mounted to said first end of said sleeve (48) for providing structural connection of parts;

ii) a first motor (26) equipped with discrete incremental movement for controlling vertical force attached to said second end of said sleeve (48);

iii) a follower (502) engaged with said first motor (26) for translating rotational movement of said first motor into vertical motion;

iv) a first spring (47) having a first and second end located vertically in said sleeve (48), said first end in contact with said follower (502) for converting vertical motion of said follower (502) into force;

v) a plunger (50) vertically guided by said dovetail fitting (52) located at said second end of said first spring (47) for receiving said force;

vi) a lever (68) pivotally attached to said dovetail fitting (52) located underneath said vertically guided plunger (50) for receiving said force for transferring said force to a side shift mechanism;

vii) a pin (60) vertically guided by said dovetail fitting (52) having a first and second end, said first end engaged with said lever (68) for following said lever (68);

vii) a first sensor (64) for sensing said second end of said vertically guided pin (60) for controlling first motor (26) position;

c) a device for discrete incremental movement of said upper blade (30) in a vertical direction comprising:

i) a second motor (20) equipped with discrete incremental movement for controlling vertical movement;

ii) a second vertical shaft (44) coupled to said second motor (20) for transmitting discrete incremental movement;

iii) a threaded sleeve (46) having a first and second end, said first end engaged with said second vertical shaft (44) for transmitting said discrete incremental movement of said second vertical shaft (44) into vertical motion and said second end rigidly attached to said dovetail fitting (52) for transferring said vertical motion to said dovetail fitting (52);

iv) a second sensor (62) for sensing said dovetail fitting (52) in a specific position for controlling second motor (20) position.

2. The apparatus of claim 1 wherein first motor (26) is a stepper motor, servo motor or vector drive motor.

3. The apparatus of claim 1 wherein second motor (20) is a stepper motor, servo motor or vector drive motor.

4. The apparatus of claim 1 wherein first sensor (62) and second sensor (64) are optical sensors, limit switches, electrical contacts or other types of proximity sensors.

5. The apparatus of claim 1, further including an electronic controller (12) for storage of control parameters for determining both the vertical position and force.

6. An apparatus for positioning a blade (30) vertically with a lower anvil (34) and applying vertical force for conversion to horizontal force by a detachable side shift mechanism against said lower anvil (34) for use in a web slitter comprising;

a) a carriage assembly b) a device coupled to the carriage assembly (11) for applying a predetermined vertical force and comprising;

i) a sleeve (48) having a first and second end and a dovetail fitting (52) mounted to said first end of said sleeve (48) for providing structural connection of parts;

ii) a first motor (26) equipped with discrete incremental movement for controlling vertical force attached to said second end of said sleeve (48);

iii) a follower (502) engaged with said first motor (26) for translating rotational movement of said first motor (26) into vertical motion;

iv) a first spring (47) having a first and second end located vertically in said sleeve (48), said first end in contact with said follower (502) for converting vertical motion of said follower (502) into force;

v) a plunger (50) vertically guided by said dovetail fitting (52) located at said second end of said first spring (47) for receiving said force;

vi) a lever (68) pivotally attached to said dovetail fitting (52) located underneath said vertically guided plunger (50) for receiving said force for transferring said force to a side shift mechanism;

vii) a pin (60) vertically guided by said dovetail fitting (52) having a first and second end, said first end engaged with said lever (68) for following said lever (68);

vii) a first sensor (64) for sensing said second end of said vertically guided pin (60);

c) a device for discreet incremental movement of said upper blade (30) in a vertical direction comprising:

i) a second motor (20) equipped with discrete incremental movement for controlling vertical movement;

ii) a second vertical shaft (44) coupled to said second motor (20) for transmitting discrete incremental movement;

iii) a threaded sleeve (46) having a first and second end, said first end engaged with said second vertical shaft (44) for transmitting said discrete incremental movement of said second vertical shaft (44) into vertical motion and said second end rigidly attached to said dovetail fitting (52) for transferring said vertical motion to said dovetail fitting (52);

iv) a second sensor (62) for sensing said dovetail fitting (52) in a specific position;

c) a lever (54) for locking and releasing a side shift mechanism against said dovetail fitting (52).

7. The apparatus of claim 6 wherein first motor (26) is a stepper motor, servo motor or vector drive motor.

8. The apparatus of claim 6 wherein second motor (20) is a stepper motor, servo motor or vector drive motor.

9. The apparatus of claim 6 wherein first sensor (62) and second sensor (64) are optical sensors, limit switches, electrical contacts or other types of proximity sensors.

10. The apparatus of claim 6, further including an electronic controller (12) for storage of control parameters for determining both the vertical position and force.

* * * * *